April 1, 1969  J. L. TOTH  3,435,729

HOLE GROOVING DEVICE

Filed Jan. 20, 1967

INVENTOR
JOSEPH L. TOTH

BY Haulke, Krass, & Gifford
ATTORNEYS

# United States Patent Office 3,435,729
Patented Apr. 1, 1969

3,435,729
HOLE GROOVING DEVICE
Joseph L. Toth, Livonia, Mich., assignor to Burr-Ban Tool Service Company, Detroit, Mich., a corporation of Michigan
Filed Jan. 20, 1967, Ser. No. 610,632
Int. Cl. B23c 1/20; B27g 15/02
U.S. Cl. 90—12    5 Claims

ABSTRACT OF THE DISCLOSURE

A hole grooving apparatus for roughening the inner surface forming the finger holes of a bowling ball having means for adjusting the device to accommodate holes of different diameters and a pivotally mounted cutting means to provide adjustment to uniformly engage the interior surface of the hole.

---

Figure 1:
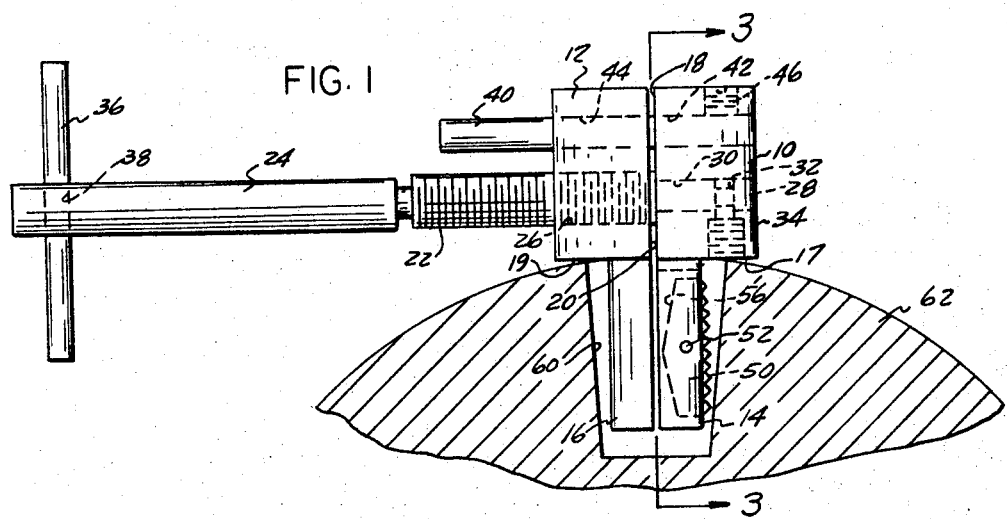

The present invention relates to cutting tools and more particularly to a device for providing grooves in the interior surface forming a hole.

It is often desirable to roughen the surfaces defining bored or otherwise formed holes. An example of this is in the bowling ball art where to aid in the proper release of the ball those surfaces which are to be gripped by the fingers are roughened or otherwise provided with friction increasing means. One means heretofore utilized for accomplishing this result has been to provide a cutting tool adapted to be positioned within the holes to produce the desired roughened surface upon the tool being moved through a rotational arc. The problem with such heretofore provided devices is that there has been no means to adjust them to accommodate different size holes so that a large number of the cutting devices must be stocked by those attempting to perform the service for the public. Further, the fact that the holes in a bowling ball are often formed such that the diameters decrease inwardly along the axis of the hole has produced problems in providing a cutter device which will accommodate such holes and which will form grooves of uniform depth. If the cutter blade extends parallel to the axis of the hole it will more deeply cut the surface near the bottom of the blade and may not roughen the upper surface of the hole at all. If the blade is inclined to accommodate these types of holes then it will not groove cylindrical holes properly.

The present invention provides a device which overcomes these disadvantages. Means are provided for adjusting the device so that it will accommodate holes of various diameters. The cutting means is pivotally mounted to the device and is adapted to adjust to the inclination of the surface forming the hole so that it will form grooves of uniform depth even in frusto-conically formed or other non-cylindrical surfaces or at least will insure that the upper portion of the hole will be grooved where the inclination of the hole forming surface is too severe to permit engagement with the surface throughout the length of the cutter blade.

It is an object then of the present invention to improve devices for roughening the surfaces forming holes by providing such a device with adjustment means permitting the accommodation of holes of various diameters.

It is another object of the present invention to improve such devices by providing cutting means adjustably mounted to permit the teeth of the cutting means to uniformly engage the surfaces to be roughened even when such surfaces are formed on a decreasing diameter or are non-cylindrical.

Figure 2:
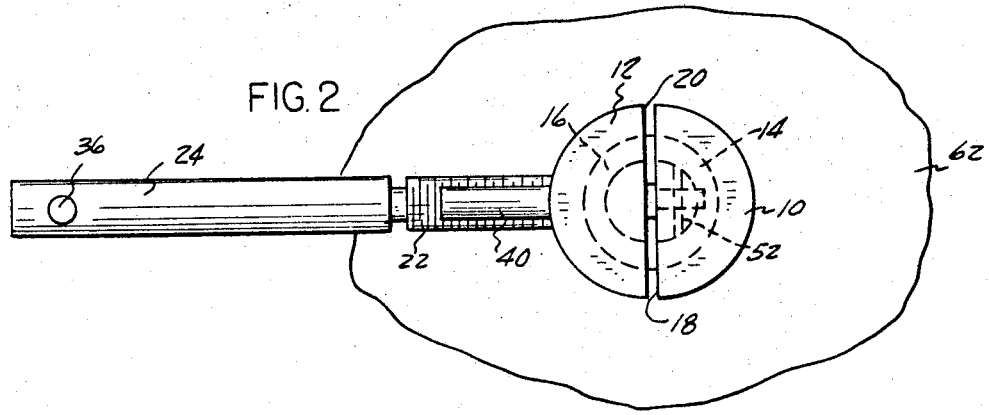
Figure 3:
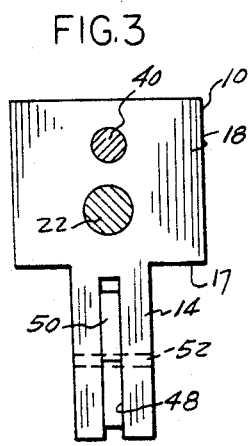
Figure 4:
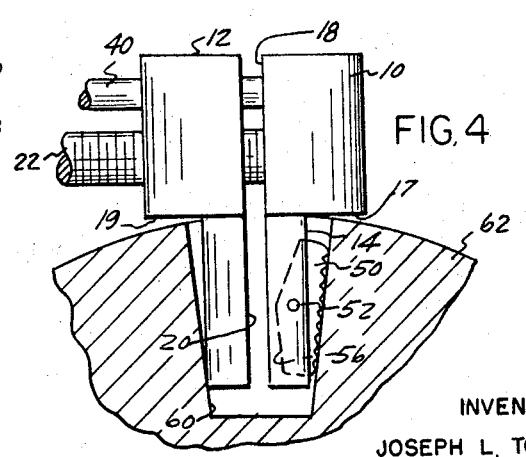

Still further objects and advantages of the present invention will readily occur to one skilled in the art to which the invention pertains upon reference to the following drawings in which like reference characters refer to like parts throughout the several views and in which;

FIGURE 1 is an elevational side view of the device of the present invention illustrating the manner in which it is positioned within a hole to be roughened, FIGURE 2 is an elevational plan view of the device of the present invention, FIGURE 3 is a cross-sectional view taken substantially on lines 3—3 of FIGURE 1, FIGURE 4 is a view similar to FIGURE 1 but illustrating the device in a position ready for use.

Now referring to the drawings for a more detailed description of the present invention, FIGURE 1 illustrates a preferred embodiment thereof as comprising a pair of substantially semi-cylindrical body members 10 and 12 each provided with a lower reduced diameter portion 14 and 16 respectively. The reduced diameter portions 14 and 16 form annular radially extending shoulders 17 and 19 in the body members 10 and 12 respectively. The body members 10 and 12 are provided with planar face sections 18 and 20 respectively and are retained in position with faces 18 and 20 opposed to each other by means of a threaded portion 22 of a handle member 24. The threaded portion 22 is received in a threaded bore 26 provided in the body member 12. The handle 24 is provided with a reduced diameter extension 28 extending into a bore 30 provided in the body member 10 in axial alignment with the threaded bore 26. The extension 28 is provided with an annular groove 32 near the end thereof and a set screw 34 carried in the body member 10 is provided with an end section which engages in the groove 32 to prevent axial displacement of the handle member 24 from the body member 10 while permitting rotation of the handle 24 in the bore of the body member 10. The end of the handle 24 opposite the extension 28 is provided with a cross member 36 preferably fixed in a transverse bore 38 provided near the end of the handle 24.

The handle 24 is rotatable about its axis in the bore 28 and such rotation causes the threads of the threaded section 22 to engage the threaded bore 26 of the body member 12. To prevent the body member 12 from rotating about the axis of the handle 24 during such rotation a guide pin 40 is provided which extends through bores 42 and 44 provided respectively in the body members 10 and 12 and which is locked to the body member 10 by means of a set screw 46. The guide member 40 permits the member 12 to move away from the body member 10 but prevents the body member 12 from being rotated during rotation of the handle 24 about its axis. Thus, it is clear that rotation of the handle 24 about its axis will produce a relative displacement between the faces 18 and 20 of the body members 10 and 12 by moving the body member 12 toward and away from the body member 10.

As can best be seen in FIGURE 3, the reduced diameter portion 14 of the body member 10 is provided with an axially extending slot 48. An elongated cutter blade 50 is pivotally mounted within the slot 48 by means of a cross pin 52. As can best be seen in FIGURES 1 and 4 the blade 50 is provided with a plurality of teeth 54 which normally extend beyond the periphery of the reduced diameter portion 14. The pin 52 is disposed substantially medially of the ends of the blade 50 and the blade 50 pivots freely about the pin 52 limited only by engagement of the back edge of the blade 50 with the face 20 of the reduced diameter portion 16. To permit some amount of pivotal movement of the blade 50 even when faces 18 and 20 are in a relatively close position, the back edge of the blade 50 is cut away inwardly from the center of the blade toward the front as shown at 56.

FIGURE 1 illustrates the device of the present invention being inserted into the finger hole 60 of a bowling ball 62. To make the desired insertion, the handle 24 is rotated about its axis until the reduced sections 14 and 16 form a diameter sufficiently small to permit the reduced diameter sections of the device to be inserted in the finger hole 60. The device is then rotated about the axis of the hole until the blade 50 is adjacent that surface forming the hole 60 which is to be roughened. In other words, the blade 50 is positioned adjacent the surface of the bowling ball 62 ordinarily gripped within the hole by the fingers of the bowler. When the device is in this position, the handle 24 is rotated in a clockwise motion about its axis to expand the device by moving the body member 12 away from the body member 10. If the surface forming the hole 60 is inclined rather than cylindrical, and this is ordinarily the way in which finger holes in bowling balls are formed, the bottom edge of the blade 50 will make contact with the surface forming the hole 60 first. This will cause the blade to pivot about the pin 52 to tip the top edge of the blade 50 against the upper surface forming the hole 60 substantially as shown in FIGURE 4. With the blade in this position the handle 24 is rotated about its axis so that there is secure contact between the blade and the surface of the hole 60. Then the handle 24 is used to reciprocally rotate the device in an arc about the axis of the hole 60. It is not necessary to completely rotate the device about the axis of the hole 60 but it is only necessary to provide a reciprocal motion in an arc along the front surface of the hole 60. The arcuate surfaces of the reduced portion 16 aids by providing support for the device during this cutting motion and by insuring opposite and two point contact during the cutting motion. During this process the handle 24 can be occasionally rotated to expand the inner device to compensate for the grooves being cut into the surface of the bowling ball. This will produce a series of grooves of substantially uniform depth which will greatly aid in producing the desired friction between the fingers of the bowler and the bowling ball.

It is apparent that the present invention provides a device for roughening the surface forming holes such as the finger holes of bowling balls and in which means are provided for adjusting the device to accommodate finger holes of various diameters. The diameters of the reduced sections 14 and 16 can be made having a diameter such that when the device is in the contracted position it will fit within the smallest finger hole drilled for bowling balls. By extending the threaded portion 22 of the handle member 24 the device can accommodate the largest diameter of finger holes drilled in bowling balls so that one device can accommodate any size hole ordinarily formed in bowling balls. The device also is provided with a uniquely constructed cutting blade 50 which by reason of its floating action on the pivot pin 52 adapts itself to the configuration of the surface forming the finger hole whether the hole be perfectly cylindrical or of some other more common shape such as frusto-conical and which also insures that that portion of the surface in which roughening is the most important will be grooved even if the inclination of the surface is so great that it is not possible to roughen the lower surface. This insures that the grooves will be formed of substantially uniform depth entirely within the area desired to produce the maximum friction. Another unique feature of the present invention is that a single handle member is used to both contract and expand the device as well as to produce the necessary cutting motion. The annular shoulders 17 and 19 engage the exterior surface of the bowling ball and thereby insure that the blade 50 will be properly positioned to make the grooves at the proper depth within the hole.

It is also apparent that although I have described but a single embodiment of my invention many changes and modifications can be made therein without departing from the spirit of the invention as expressed by the scope of the appended claims.

I claim:
1. A device for roughening the surfaces forming a hole in materials such as the surfaces defining the finger holes of a bowling ball, said device comprising:
  (a) a pair of substantially semi-cylindrical body members formed on substantially the same radii and means adjustably mounting said body members together whereby in a contracted position they are substantially cylindrical,
  (b) adjustable means comprising an elongated rod extending radially through said body members, means mounting one portion of said rod to one of said body members in a manner preventing axial displacement of said rod from said body member but permitting rotational movement of said rod with respect to said body member, means provided on said rod for producing relative displacement between said other body member and said rod upon rotation of said rod,
  (c) means preventing rotation of said second mentioned body member with respect to said first mentioned body member whereby upon rotation of said rod said second mentioned body member is moved in a direction along the axis of said rod toward and away from said first mentioned body member intermediate said contracted position and an expanded position,
  (d) means carried along the surface of one of said body members for producing cutting of the surface forming said hole upon rotation of said body member about the axis of the hole.

2. The device as defined in claim 1 and in which said last mentioned means comprises an elongated member pivotally carried by said body member and pivotal about an axis substantially normal to the axis of said hole.

3. The device as defined in claim 1, and in which said last mentioned means comprises;
  (a) said first mentioned body member being provided with an axially elongated slot,
  (b) an elongated blade member carried in said slot and pivotally mounted to said body member by means of a pin extending through said blade substantially medially of the ends thereof,
  (c) said blade being provided with a plurality of teeth along one edge thereof,
  (d) said edge and said teeth being disposed exteriorly of the surface of said body member to engage the surface forming said hole.

4. The device as defined in claim 1 and in which said rotation prevention means comprises a guide pin fixed to one of said body members and extending transversely therefrom, and a bore being provided in the other of said body members for axially slidably receiving said guide pin.

5. The device as defined in claim 1 and in which:
  (a) said body members are each provided with a lower reduced diameter portion, and
  (b) said reduced diameter portions being adapted to be positioned within said hole and forming radially extending shoulders at the juncture of said reduced diameter portions with the remaining portions of said body members whereby said shoulders are adapted to engage the exterior surface of the bowling ball to properly position said cutting means within the hole.

References Cited

UNITED STATES PATENTS

| 2,640,518 | 6/1953 | Berghorn | 145—114 |
| 2,671,381 | 3/1954 | Carlson | 90—12 |
| 2,949,064 | 8/1960 | Adcock | 90—12 |

DONALD R. SCHRAM, *Primary Examiner.*

U.S. Cl. X.R.

144—2; 145—114